(No Model.)

O. L. CASTLE.
NUT LOCK.

No. 383,212. Patented May 22, 1888.

WITNESSES:
John M. Reemer
C. Sedgwick

INVENTOR:
O. L. Castle
BY Munn & Co.
ATTORNEYS.

UNITED STATES PATENT OFFICE.

ORLANDO LANE CASTLE, OF UPPER ALTON, ILLINOIS, ASSIGNOR TO THE GORDIAN NUT LOCK ASSOCIATION, OF LAKEPORT, CALIFORNIA.

NUT-LOCK.

SPECIFICATION forming part of Letters Patent No. 383,212, dated May 22, 1888.

Application filed December 30, 1887. Serial No. 259,393. (No model.)

*To all whom it may concern:*

Be it known that I, ORLANDO LANE CASTLE, of Upper Alton, in the county of Madison and State of Illinois, have invented a new and useful Improvement in Nut-Locks, of which the following is a full, clear, and exact description.

This invention relates to that description of nut-locks for use in connection with the fish-plates at the joint or abutting end portions of railroad-rails in which arch-shaped spring-plates are used to assist in keeping the nuts of the bolts which secure the fish-plates to their places from working loose or turning, and to compensate for or take up any slack that may occur in the nut-lock.

My invention consists in certain novel constructions and combinations of parts in a nut-lock of this description, substantially as hereinafter described, and pointed out in the claim, whereby not only the above results are very perfectly secured, but the nuts of the bolts have a firm unyielding rest for their bases independently of the spring-plates, so as not to interfere with the operation of the latter in taking up slack or to unduly crush or destroy the elasticity of them.

Reference is to be had to the accompanying drawings, forming a part of this specification, in which similar letters of reference indicate corresponding parts in all the figures.

Figure 1:
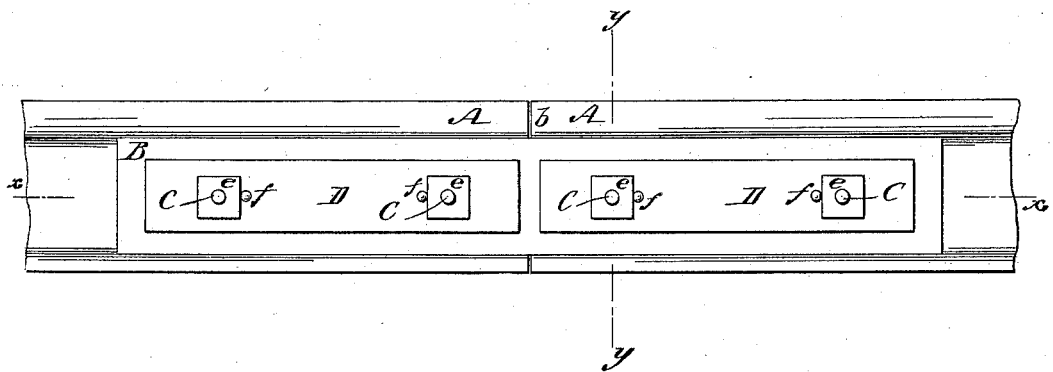
Figure 2:
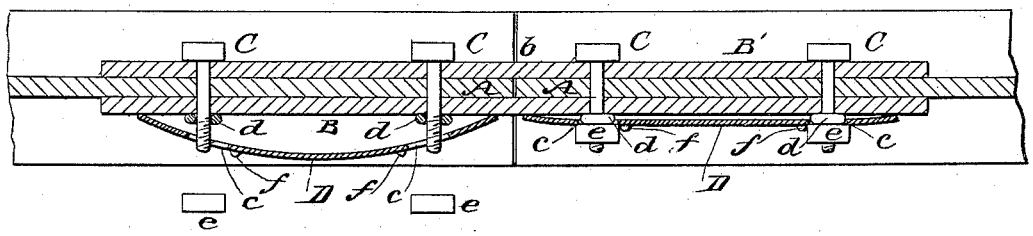
Figure 3:
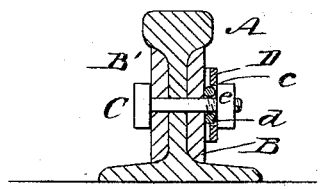

Figure 1 represents a side elevation of two meeting railroad-rails, in part, with my invention applied; Fig. 2, a horizontal section of the same upon the line $x\,x$ in Fig. 1, and Fig. 3 a transverse vertical section upon the line $y\,y$ in Fig. 1.

A A are two meeting railroad-rails in part, and B B' the usual or any suitable fish-plates applied to the opposite sides of the meeting end portions of said rails to hold the latter in proper continuity and to secure them together by the bolts C C of the nut-lock, of which there may be two on each side of the joint $b$ between the rails closed or covered by the fish-plates.

D D are the arched elastic or spring plates, one of which is applied to the nut ends of each pair of bolts on opposite sides of the joint $b$. Each of these bowed elastic plates D has apertures $c$ in it arranged to be in concentric relation with the bolts C C on either side of the joint $b$. These apertures $c$ are made large enough to receive within and through them inelastic washers or rings $d$, of a sufficient thickness to pass through the apertures $c$, while the elastic plate D is still kept bowed or bellied from the fish-plate B, against which the ends of said elastic plate rest, and so that the nuts $e$ of the bolts C, when screwed up, bear at their bases against the rings $d$ as a solid rest. Furthermore, each spring-plate D is constructed or provided with exterior knobs or projections, $f$, which may be struck up by indenting or otherwise forming said plate upon one side of the apertures $c$, so as to lock or hold the nuts $e$ from turning.

In putting the whole together the rings $d$ are first placed upon the bolts C C, after the latter have been passed through the fish-plates B B' and intervening rail. Either spring-plate D is then applied over the nut end of the bolts, and the nuts $e$ screwed up firmly upon said rings $d$, as the spring-plate D is flexed or carried down to receive said rings through the apertures $c$ in said plate. These rings $d$, being somewhat thicker than the spring-plate D, relieve said plate from undue pressure, and so that it will be free to further yield as the corners or angles of the nuts $e$ pass over the knobs or projections $f$ when turning the nuts either forward or backward. When the nuts are screwed up, their flat sides rest within the knobs or projections $f$, which serve to keep the nuts from working loose or turning. The force required to turn the nuts in either direction will be proportioned to the resistance of the spring or spring-plate, and the shape and size of the knobs or projections $f$ can be graduated so as to hold the nuts in place, and at the same time, by the yielding of the spring-plate, allow them to be turned as occasion may demand, for tightening them down or upon the rings $d$ or for removing them.

By this construction and combination of parts it will be seen that the thickened inflexible rings or washers $d$, passing through the apertures $c$ in the spring-plate D, perform an important part. Thus they give a solid bearing for the nuts $e$ when screwed down and prevent the spring-plate from being unduly crushed, so as to preserve its elasticity and to cause it to act with an elastic pressure upon the nuts, in order to assist in holding the nuts from working loose, as well as to compensate for or take up any slack that may occur, and the knobs or projections *f* further lock or hold the nuts from being improperly or accidentally turned.

Having thus described my invention, what I claim as new, and desire to secure by Letters Patent, is—

In a nut-lock for railroad-rails, the combination of the arched spring-plate D, having enlarged apertures *c* at its ends and provided with projections *f* at the sides of the said apertures, the bolts C, the inflexible rings or washers *d*, of greater thickness than the spring-plate and smaller than the apertures in the said plate, and the nuts *e*, substantially as herein shown and described.

ORLANDO LANE CASTLE.

Witnesses:
L. M. CASTLE,
C. W. LEVERETT.